United States Patent
Lazarev et al.

(10) Patent No.: US 12,332,192 B2
(45) Date of Patent: Jun. 17, 2025

(54) ALPHA DIFFRACTOMETER

(71) Applicant: Arion Diagnostics, Inc., Petaluma, CA (US)

(72) Inventors: Alexander P. Lazarev, Lake Forest, CA (US); Pavel I. Lazarev, Menlo Park, CA (US); Delvin Tai Wai Yuk, Atherton, CA (US)

(73) Assignee: Arion Diagnostics, Inc., Petaluma, CA (US)

( * ) Notice: Subject to any disclaimer, the term of this patent is extended or adjusted under 35 U.S.C. 154(b) by 138 days.

(21) Appl. No.: 18/137,356

(22) Filed: Apr. 20, 2023

(65) Prior Publication Data

US 2023/0341339 A1    Oct. 26, 2023

Related U.S. Application Data

(60) Provisional application No. 63/333,087, filed on Apr. 20, 2022.

(51) Int. Cl.
*G01N 23/207* (2018.01)
*G01N 23/20008* (2018.01)

(52) U.S. Cl.
CPC ..... *G01N 23/207* (2013.01); *G01N 23/20008* (2013.01); *G01N 2223/1016* (2013.01)

(58) Field of Classification Search
CPC ........... G01N 23/207; G01N 23/20008; G01N 2223/1016
See application file for complete search history.

(56) References Cited

U.S. PATENT DOCUMENTS 3,639,764 A    2/1972   Olson et al.
3,824,397 A    7/1974   Bauer et al.
(Continued)

FOREIGN PATENT DOCUMENTS

| CN | 110907483 A | * | 3/2020 | |
| CN | 109324072 B | * | 5/2021 | ....... G01N 23/20008 |
| WO | 2021257451 A1 | | 12/2021 | |

OTHER PUBLICATIONS

Translation of CN 110907483 A (Year: 2019).*
(Continued)

*Primary Examiner* — David P Porta
*Assistant Examiner* — Mamadou Faye
(74) *Attorney, Agent, or Firm* — MLO, a professional corp.

(57) ABSTRACT

An X-ray diffractometer system analyzes objects including biological tissue samples and physical and chemical samples. The diffractometer system includes an X-ray beam projector that projects an incident micro-beam of X-ray at an analysis target, an X-ray receiver including an X-ray detector array to detect the transmitted X-rays passed through the object and X-rays that the target diffracts, and a computer workstation for system control and data analysis. The X-ray beam projector may include a radiation source, a beam forming system including at least one of a monochromator, a collimator, and focusing device. The computer workstation may control the X-ray devices and positioning mechanisms and motors, may acquire, process, store, or display data received from diffractometric examination, and may also calculate parameters of the three-dimensional reciprocal lattice of the analyzed target.

20 Claims, 3 Drawing Sheets

(56) References Cited

U.S. PATENT DOCUMENTS

| | | | |
|---|---|---|---|
| 4,829,549 | A | 5/1989 | Vogel et al. |
| 5,717,733 | A | 2/1998 | Kurbatov et al. |
| 5,748,704 | A | 5/1998 | Mazess et al. |
| 6,175,117 | B1 | 1/2001 | Komardin et al. |
| 6,315,445 | B1 | 11/2001 | Mazess et al. |
| 6,320,931 | B1 | 11/2001 | Arnold |
| 6,405,068 | B1 | 6/2002 | Pfander et al. |
| 6,718,007 | B1 | 4/2004 | James |
| 7,136,454 | B2 | 11/2006 | Gerndt et al. |
| 7,794,144 | B2 | 9/2010 | Windt |
| 8,553,840 | B2 | 10/2013 | James |
| 8,971,488 | B2 | 3/2015 | Parham et al. |
| 9,025,725 | B2 | 5/2015 | Kiyohara et al. |
| 9,046,471 | B2 | 6/2015 | Ueji |
| 9,968,314 | B1 | 5/2018 | Sebring |
| 10,966,677 | B2 | 4/2021 | Matsuura et al. |
| 10,993,685 | B2 | 5/2021 | Schraven |
| 11,403,793 | B2 | 8/2022 | König et al. |
| 11,607,188 | B2 | 3/2023 | Lazarev et al. |
| 11,751,828 | B2 | 9/2023 | Lazarev et al. |
| 12,094,609 | B2 | 9/2024 | Lazarev et al. |
| 12,094,610 | B2 | 9/2024 | Lazarev et al. |
| 2001/0053202 | A1 | 12/2001 | Mazess et al. |
| 2003/0000291 | A1* | 1/2003 | Kolosov ............... G01N 9/32 73/61.52 |
| 2003/0012334 | A1* | 1/2003 | Kurtz ............... G01N 23/20 378/81 |
| 2003/0014418 | A1 | 1/2003 | Adler et al. |
| 2005/0259790 | A1 | 11/2005 | Gerndt et al. |
| 2006/0015265 | A1 | 1/2006 | Raich |
| 2007/0032832 | A1 | 2/2007 | Feher |
| 2009/0190722 | A1 | 7/2009 | Windt |
| 2009/0299642 | A1 | 12/2009 | French et al. |
| 2010/0135461 | A1 | 6/2010 | James |
| 2012/0039438 | A1 | 2/2012 | Parham et al. |
| 2012/0091333 | A1 | 4/2012 | French et al. |
| 2013/0077753 | A1 | 3/2013 | James |
| 2013/0121460 | A1* | 5/2013 | Mitsunaga ....... G01N 23/20008 378/71 |
| 2013/0138382 | A1* | 5/2013 | Mitsunaga ............. G01N 23/20 702/123 |
| 2013/0182824 | A1 | 7/2013 | French et al. |
| 2013/0259194 | A1 | 10/2013 | Yip et al. |
| 2013/0259199 | A1 | 10/2013 | Ueji |
| 2014/0117247 | A1* | 5/2014 | Hamlin ............... G01T 1/247 250/394 |
| 2015/0030126 | A1* | 1/2015 | Radicke ............... A61B 6/484 378/62 |
| 2015/0233804 | A1* | 8/2015 | Meisberger .......... G01N 23/201 378/53 |
| 2016/0235372 | A1 | 8/2016 | Schneider et al. |
| 2017/0160212 | A1* | 6/2017 | Kleine ................ G01T 7/005 |
| 2017/0362585 | A1 | 12/2017 | Wang et al. |
| 2018/0199901 | A1 | 7/2018 | Schraven |
| 2020/0083080 | A1* | 3/2020 | Clark ............... H01L 21/76834 |
| 2020/0100747 | A1 | 4/2020 | Matsuura et al. |
| 2020/0302660 | A1 | 9/2020 | König et al. |
| 2022/0013227 | A1 | 1/2022 | Lazarev et al. |
| 2022/0013233 | A1 | 1/2022 | Lazarev et al. |
| 2022/0381710 | A1* | 12/2022 | Evans ................. G01N 23/205 |
| 2022/0415505 | A1 | 12/2022 | Lazarev et al. |
| 2023/0113064 | A1 | 4/2023 | Yuk et al. |
| 2023/0207074 | A1 | 6/2023 | Lazarev et al. |
| 2023/0240635 | A1 | 8/2023 | Lazarev et al. |
| 2023/0240636 | A1 | 8/2023 | Lazarev et al. |
| 2023/0270396 | A1 | 8/2023 | Lazarev et al. |
| 2023/0341339 | A1 | 10/2023 | Lazarev et al. |
| 2023/0341340 | A1 | 10/2023 | Lazarev et al. |
| 2024/0000412 | A1 | 1/2024 | Lazarev et al. |
| 2024/0016462 | A1 | 1/2024 | Lazarev et al. |
| 2024/0161893 | A1 | 5/2024 | Lazarev et al. |

OTHER PUBLICATIONS

Translation of CN-109324072-B (Year: 2021).*

Gimenez, Eva N. et al., "Evaluation of the Radiation Hardness and Charge Summing Mode of a Medipix3-based detector with Synchrotron Radiation" IEEE Nuclear Science Symposium & Medical Imaging Conference, Knoxville, TN, USA (2010) pp. 1976-1980. IEEE 978-1-4244-9105-6/10.

Azarev, P. et al., "Human Tissue X-ray Diffraction: Breast, Brain, and Prostate" Proceedings of the 22nd Annual EMBS International Conference (Jul. 23-28, 2000) Chicago, IL, pp. 3230-3233. IEEE 0-7803-6465-1/00.

Matsui, J. et al., "Microscopic strain analysis of semiconductor crystals using a synchrotron X-ray microbeam" Journal of Crystal Growth, 237-239 (2002) pp. 317-323.

Treis, J. et al., "Pixel detectors for x-ray imaging spectroscopy in space" Pixel 2008 International Workshop, Fermilab, Batavia, IL., USA (Sep. 23-26, 2008) pp. 1-19.

Tsusaka, Yoshiyuki et al., "Formation of Parallel X-Ray Microbeam and Its Application" Japanese Journal of Applied Physics, Part 2: No. 6B (Jun. 15, 2000) pp. L 635-L637.

Wermes, N., "Pixel Detectors" arXiv:physics/0512037v1 [physics. ins-det] (Dec. 5, 2005) Physikalisches Institut der Universit, Bonn, Germany. pp. 1-14.

Fagundes et al., "Structural characterization of canine mammary tissue by x-ray diffraction", Radiation Physics and Chemistry, vol. 155, pp. 22-25. (Year: 2019).

Ghammraoui et al., "Maximum-likelihood estimation of scatter components algorithm for x-ray coherent scatter computed tomography of the breast", Physics in Medicine & Biology, vol. 61, pp. 3164-3179. (Year: 2016).

Graewet et al., "Impact and progress in small and wide angle X-ray scattering (SAXS and WAXS)", Current Opinion in Structural Biology, vol. 23, pp. 748-754. (Year: 2013).

Office Action dated Dec. 9, 2024 for U.S. Appl. No. 18/137,342.

* cited by examiner

ALPHA DIFFRACTOMETER

CROSS-REFERENCE TO RELATED APPLICATIONS

This patent document claims benefit of the earlier filing date of U.S. provisional Pat. App. No. 63/333,087, filed Apr. 20, 2022, which is hereby incorporated by reference in its entirety.

BACKGROUND

X-ray analysis is widely used in science, technology, medicine, and veterinary medicine. Some advantages of X-ray analysis in medicine and veterinary medicine are that X-ray imaging is accessible, painless, and able produce detailed images of internal bones and soft tissues. More generally, radiological imaging techniques, including X-rays, CT scans, PET scans, MRIs, and ultrasonograms, may be the most informative method available for examining musculoskeletal systems, internal organs, neurology, ear nose and throat (ENT) structures, oral cavities, and diseases affecting such systems. Radiography is particularly important for the study of internal organs to detect foreign bodies and neoplasms, including malignant ones.

Small-angle X-ray spectroscopy has been proposed for study the structure of potential cancer sites. See, P. Lazarev et al., "Human Tissue X-ray Diffraction: Breast, Brain, and Prostate", Proceedings of the 22nd Annual International Conference of the IEEE Engineering in Medicine and Biology Society (Cat. No. 00CH37143) Vol. 4, pp. 3230-3233, July 2000. The authors of this paper report that upon the incidence of X-ray radiation onto a sample, part of the radiation goes through the object unaffected, a part is absorbed, and a part is scattered. Absorption and incoherent scattering are related to the atomic composition and density of the sample. Coherent scattering is related to the molecular structure of the sample. The intensity of coherently scattered (or diffracted) radiation as a function of angle depends on the molecular structure of the object being irradiated, and every molecular structure has its own "signature" scattering pattern. Therefore, the study of scattering patterns of various materials can characterize molecular structures and recognize or distinguish specific molecular structures when encountered.

X-ray diffractometers that provide higher resolution measurements of scattered radiation can more effectively distinguish molecular structures, and several techniques may increase the spatial resolution of an X-ray diffractometer. One technique uses parallel or collimated X-ray micro-beams. For example, a parallel X-ray micro-beam may have a size of about 7×5 µm with a small angular divergence, which aims high resolution strain measurements in a very local area. See, Tsusaka, Yoshiyuki; Yokoyama, Kazushi; et. al., "Formation of parallel X-ray micro-beam and its application", Japanese Journal of Applied Physics, Part 2: Letters (2000), 39(6B), L635-L637. The micro-beam was formed by compressing and collimating the X-rays from a 3rd-generation undulator source using successive asymmetrical reflections. Rocking curve measurements have used such beams to evaluate the strain that field oxidation induces in silicon (Si) wafers. In such cases, the lattice constant in the silicon region near the oxide film edge is contracted and in the SiO/Si transition region is extended. The difference between these lattice constants is as small as about $\Delta d/d$ approx. $\pm 5 \times 10^{-6}$ but may be measured using X-ray diffraction techniques.

Another way to increase spatial resolution is to use a pixel detector with small pixel sizes, e.g., from 100-300 microns to 55 microns and below. See, N. Wermes, "Pixel Detectors", arXiv:physics/0512037v1 [physics.ins-det] 5 Dec. 2005, Physikalisches Institut der Universit¨at Bonn, Germany; J. Treis,a,b,1 R. Andritschke, et. al., "Pixel Detectors for X-ray Imaging Spectroscopy in Space", published by IOP publishing for Sissa, Pixel 2008 International Workshop Fermilab, Batavia, IL, U.S.A. 23-26 Sep. 2008. But reducing the detector pixel size may increase charge-shared events across pixels, which leads to a degradation of the image quality and energy resolution.

E. N. Gimenez et al., "Evaluation of the radiation hardness and Charge Summing Mode of a Medipix3-based detector with synchrotron radiation," IEEE Nuclear Science Symposium & Medical Imaging Conference, Knoxville, TN, USA, 2010, pp. 1976-1980 notes that synchrotron applications such as coherent X-ray diffraction and X-ray photon-correlation spectroscopy require detectors with a pixel pitch of 50 µm as highlighted by a survey with beamline scientists of Diamond Light Source synchrotron. Furthermore, an X-ray detector should also have a high frame rate, large dynamic range, and large detection efficiency. The Medipix3 readout chip with a pixel pitch of 55 µm emerged as a good candidate to develop a new detector for the aforementioned applications. Additionally, the Medipix3 readout chip implements an operating mode, referred to as Charge Summing Mode (CSM), with the purpose of eliminating charge-shared events. This mode can be very useful since the charge-sharing effect increases as the detector pixel size decreases. Also, the Medipix3 readout chip may be more radiation hard than its predecessor Medipix2.

U.S. Pat. No. 6,175,117, entitled "Tissue analysis apparatus" describes an X-ray apparatus that measures small-angle X-rays for analysis of substances within a breast. The apparatus includes a breast positioning area, a beam forming apparatus that forms X-rays into at least one beam, and a detector that detects a scattering pattern of X-rays scattered from the portion of the breast positioned within the breast positioning area. The X-ray apparatus uses a filter as a stopper of the incident beam to prevent the transmitted X-rays from harming (e.g., overheating or destroying) the detector. The filter has an upper surface with a shape matching the shape of the cross section of the transmitted beam and must be accurately positioned in the transmitted beam such that the upper surface is matched to the outer edges of the transmitted beam. During X-ray diffraction analysis, the filter needs to be moved in and out of the transmitted beam as a detector position adjuster moves the detector relative to the positioning area. All this places high demands on the accuracy of manufacturing the structural elements of the apparatus and makes the apparatus complex to use.

DETAILED DESCRIPTION

An X-ray diffractometer in accordance with some examples disclosed herein may perform X-ray structural analysis of objects including parts of living humans or other animals, biological tissue samples, and physical and chemical samples. Some examples of the x-ray diffractometer allow 3-D diffractometric structural analysis, as well as calculation of the parameters of the three-dimensional reciprocal (reverse) lattice of an object under study. In particular, an X-ray diffractometer in accordance with an example disclosed herein can detect cancerous areas in the internal organs of humans and animals and study changes in the structure of the tissue in areas.

An X-ray diffractometer in accordance with one example of the present disclosure does not employ a beam stopper and thereby overcomes drawbacks of prior diffractometric devices, such as technical difficulties of fabrication, complexity of configuration, and low resolution. In addition, a diffractometer such as disclosed herein has resistance to the external environment and insensitivity to external mechanical influences. Another feature of some examples of the disclosed diffractometer is the ability of a two-dimensional pixel detector to mechanically move along the direction of the incident X-ray beam and to perform oscillatory movements in a plane perpendicular to the incident beam.

An X-ray diffractometer in accordance with a specific example includes a computer workstation, an X-ray projector directing an incident micro-beam of X-rays at the analyzed object in a positioning area, and a receiver including an X-ray detector array capable of detecting the transmitted X-ray micro-beam passed through the analyzed object and detecting all or a portion of the X-rays that the analyzed object diffracts or otherwise scatters. The X-ray beam projector may include a radiation source operating in continuous mode and an apparatus forming X-ray micro-beam. The beam forming apparatus may include at least one monochromator and at least one collimating and focusing optical device. The computer workstation may be configured to control the X-ray transmitter and receiver, to control positioning mechanisms and motors and to process, store, and display data from 3-D diffractometric examinations and structural analysis. The workstation may also be configured to calculate parameters of a three-dimensional reciprocal lattice in the analyzed object.

Figure 1:
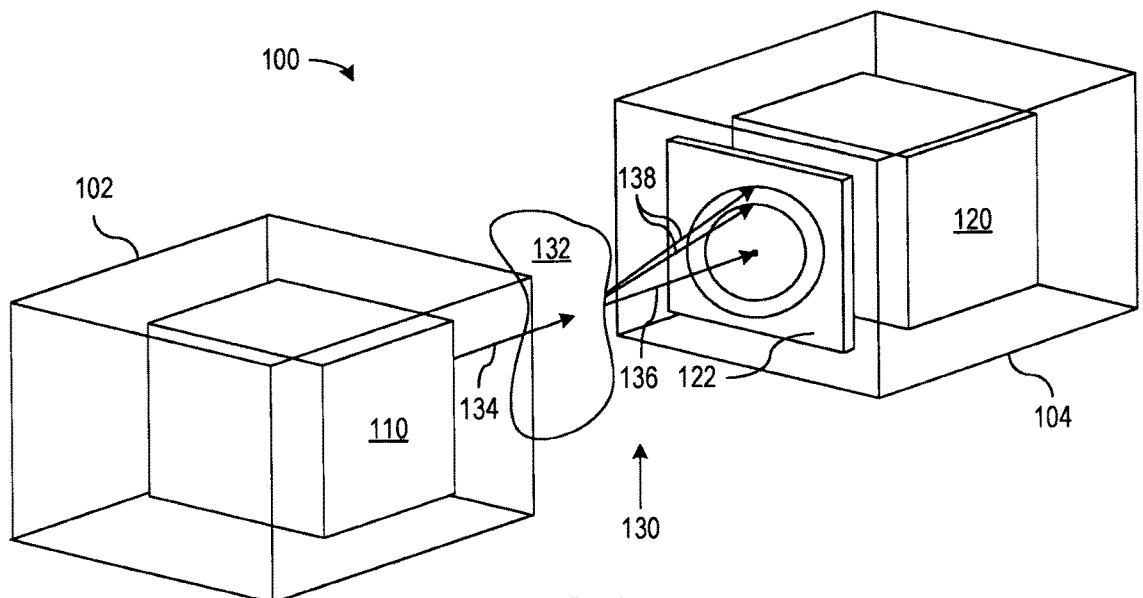
FIG. 1 shows perspective view of a diffractometer in accordance with an example of the present disclosure.
Figure 2:
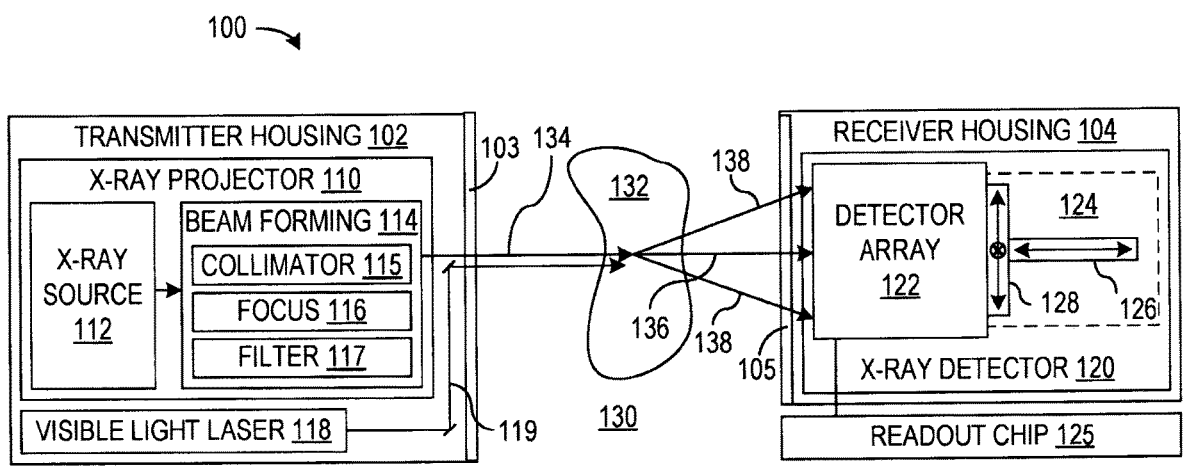
FIG. 2 is a block diagram of a diffractometer in accordance with an example of the present disclosure.

FIG. 1 shows a perspective view of an X-ray diffractometer 100 in accordance with an example of the present disclosure, and FIG. 2 is a block diagram identifying in more detail some components of X-ray diffractometer 100. As shown in FIGS. 1 and 2, X-ray diffractometer 100 includes a transmitter housing 102 containing an X-ray beam projector 110 and a receiver housing 104 containing an X-ray detector 120. Transmitter housing 102 and receiver housing 104 are separated from each other by (or otherwise define) an intervening examination volume 130 in which a target 132 to be examined may be held between X-ray beam projector 110 and X-ray detector 120.

In one specific example, transmitter housing 102 or receiver housing 104 is a protective container that holds one or more X-ray devices, e.g., projector 110 or detector 120, in a vacuum or surrounded by an inert gas such as helium or neon. Each of housings 102 and 104 has a side wall 103 or 105 facing target 132, and all or a portion of each side wall 103 or 105 may be transparent to X-rays. For example, wall 103 may include a beryllium window through which X-rays from projector 110 enter examination volume 130, and wall 105 may include another beryllium window through which X-rays pass from examination volume 130 to X-ray detector 120 inside receiver housing 104. Each container 102 or 104 may specifically be filled with an inert gas such as neon or helium. In yet another example, diffractometer 100 further employs a chamber filled with an inert gas which is placed between detector 120 and target 132 in a working state and is set aside in non-working state.

X-ray beam projector 110 directs an X-ray beam 134 into target 132 in examination volume 130. A portion of X-ray beam 134 may be transmitted through target 132 and forms a transmitted X-ray beam 136 that may be parallel or colinear with incident X-ray beam 134. Another portion of incident X-ray beam 134 may interact with target 132 producing scattered X-rays 138, which may include coherently scattered X-rays, i.e., diffracted X-rays or incoherently scattered X-rays.

X-ray projector 110 in the example of FIG. 2 includes an X-ray source 112 and beam forming system 114. X-ray source 112 may, for example, be an X-ray tube or X-ray laser. X-ray micro-beam forming system 114 may include one or more of an X-ray collimator 115, an X-ray focusing element, and a filter 117. X-ray collimator 115 may, for example, include a Kratki or Montel mirror collimator. Alternatively, X-ray collimator 115 may include a pair of X-ray mirrors that are arranged orthogonally relative to each other where each X-ray mirror is a multilayer film mirror. Focusing systems 116 may include grazing-incidence mirrors that are slightly curved to focus X-ray beam 134. Filter systems 117 of x-ray beam forming system 114 may include, for example, at least one monochromator. In one specific example, x-ray source 112 includes a radiation source operating in continuous mode, e.g., x-ray tube, to produce monochromatic x-rays and x-ray beam conditioner 114 includes a collimating mirror and aperture that form or shape the x-ray micro-beam 112. Alternatively, x-ray beam conditioner 114 may employ any other systems capable of controlling the width, collimation, or other characteristics of x-ray beam 142.

In operation, beam conditioner 114 receives x-rays from x-ray source 112 and produces an x-ray beam 142 having desired intensity, wavelength, and beam profile. X-ray beam 142 may, for example, be is a micro-beam having a FWHM of about 200 microns or less, a wavelength of 1.60 Å to 0.3 Å, and an intensity on the order of about $10^{12}$ photons/sec/mm$^2$.

In some examples disclosed herein, a visible light laser 118 may be mounted in or on transmitter housing 102, and an optical system may direct a beam 119 of visible along a path parallel to X-ray micro-beam 134. In examination volume 130, visible beam 119 may coincide with or propagate adjacent to X-ray micro-beam 134, so that beam 119 may be used to point X-ray beam 134 at selected points on the target 132 being examined.

X-ray detector 120 includes an X-ray detector array 122 on a mounting system or stage 124. In one example disclosed herein, X-ray detector array 122 is a an X-ray detector array including a two-dimensional array of detector elements, each of which provides a signal upon receiving of X-ray photon. Stage 124 generally holds detector array 122 so that transmitted X-ray beam 146 is perpendicular to the surface of detector array 122. Stage 124 is also capable of moving detector array 122. More particularly, stage 124 includes a mechanism 126 to mechanically move detector array 122 toward or away from target 132 along the propagation direction of transmitted beam 136 and a mechanism 128 to transversely move or oscillate detector array 122 in a plane perpendicular to the propagation direction of transmitted beam 136. As described further below, the oscillation capabilities of stage 134 allow use of diffractometer 100 without a beam stopper to protect X-ray detector array 122, while still avoiding damage that the intensity of transmitted X-ray beam 136 might otherwise cause to X-ray detector array 122. The absence of a beam stopper avoids parasitic scattering from the beam stopper and reduces noise in measurements of scattered X-rays 138.

Stage 124 (particularly mechanism 126) as described above can move detector array 122 relative to target 132 along the propagation direction of X-ray beams 134 and 136. For movement along the beam direction, mechanism 126 may include a drive train similar to the drive trains used to adjust the height of optics assemblies in photocopiers. Movement of detector array 122 relative to target 132 changes the angular resolution and the angular range of detector array 122 for measurements of scattered radiation 138. For instance, moving the detector further from target 132 increases the area of detector array 122 exposed to radiation scattered over a smaller range of angles. On the other hand, moving the detector closer to the object increases the area of detector array 122 exposed to radiation scattered over a larger range of angles, e.g., up to close to 90°. The larger the detector area exposed to radiation scattered over a fixed range of angles, the higher the resolution of the detector with respect to those angles. Mechanism 124 may provide a range of movement that produces approximately the same resolution of diffraction measurements at small (less than) 1° and large (approximately about 90°) of diffraction angles. Stage 124 may thus be used to position detector array 122 to achieve a desired resolution when measuring radiation 138 scattered to angles of interest.

Incident X-ray beam 134 may be a collimated beam, e.g., contain X-rays having a uniform direction of travel, or may be focused, e.g., be converging on a focal point at or near the active surface of detector array 122 to effectively increase the angular range of scattered X-rays that detector array 122 may measure. Transmitted x-ray beam 136 may have similar beam characteristics, e.g., size, collimation, or convergence, as incident X-ray beam 134. In some implementations, the area of detector array 122 receiving transmitted X-ray beam 136 may be less than size of a single pixel on detector array 122, which allows a single pixel at time to capture and measure transmitted beam 136, while the rest of the area of detector array 122 detects scattered X-rays 138.

FIG. 2 illustrates an example of X-ray diffractometer 100 in which stage 124 includes a mechanism 128 that excites transverse, i.e., transverse to the direction of transmitted X-ray beam 136, vibrations of two-dimensional detector array 122. Several types of transverse vibrations may be employed. For example, one type of vibration may include linear fluctuations only in the equatorial (horizontal) direction. Alternatively, vibration may include linear fluctuations only in the meridional (vertical) direction. Yet another type of vibration may include fluctuations in the equatorial and meridional directions simultaneously. The transverse vibrations of X-ray detector array 122 may be due to the excitement of a longitudinal surface acoustic wave. In one example, mechanism 128 uses a piezoelectric effect and moves detector array 122 in response to one or more oscillating electrical signals. To avoid having transmitted X-ray beam 136 constantly incident on the same pixel or pixels of detector array 122, the amplitude of the transverse vibrations of two-dimensional detector array 122 may be greater than or equal to a pitch of the pixels in detector array 122 and greater than or equal to the width of transmitted X-ray beam 136 at detector array 122. The frequency of the transverse vibrations of the two-dimensional detector array 122 may be less than or equal to a frame rate at which detector array 122 captures measurements of transmitted and scattered X-rays 136 and 138. In one example, a readout chip 125, which may control the frame rate for two-dimensional detector array 122, implements an operating mode referred to as Charge Summing Mode (CSM) with the purpose of eliminating charge-shared events.

A diffractometer as disclosed herein may move X-ray projector 110 and X-ray detector 120 to obtain 3D-diffractometric X-ray diffraction data without changing object position, e.g., the position of target 132. Alternatively, target 132 may be moved, e.g., rotated around the vertical axis, so that diffractometer 200 can obtain the 3D-diffractometric X-ray diffraction data. In another example disclosed herein, the computer workstation executes process controlling programs that perform 3-D diffractometric data collection at different angles of rotation of a C-arc in each mutually perpendicular planes sequentially, and for each angle of rotation of the C-arc in these planes, a series of diffraction measurements is carried out with a change in the distance from the analyzed subject to the two-dimensional pixel detector.

In still another example disclosed herein X-ray beam projector 110 and the receiver of X-rays are mounted on telescoping arms attached to a wall or a ceiling of the laboratory room, wherein these X-ray devices are located at one or two telescoping arms and furthermore the diffractometer further includes at least one housing including mechanisms and motors designed to move these telescoping arms.

In one example disclosed herein the detector pixels are characterized by different values of the maximum permissible power density of X-ray radiation incident on one pixel, moreover, the pixels located in the central region of the flat pixel-detector have the highest maximum permissible power density compared to the pixels located on the periphery. In another example disclosed herein the maximum permissible power density of each pixel is inversely proportional to the distance between this pixel and the central pixel of the pixel-detector.

In one example disclosed herein, the diffractometer further includes facilities and mechanisms designed to move the positioning area for the examination target between the X-ray beam projector and the receiver along the direction of the incident X-ray beam. By way of example, and not by way of limitation, as facilities and mechanisms may be used mechanical guides and stepper motors. In another example disclosed herein the diffractometer further includes a rectification collimator located in the positioning area near the analyzed target 132 and facing X-ray beam projector 110.

Figure 3:
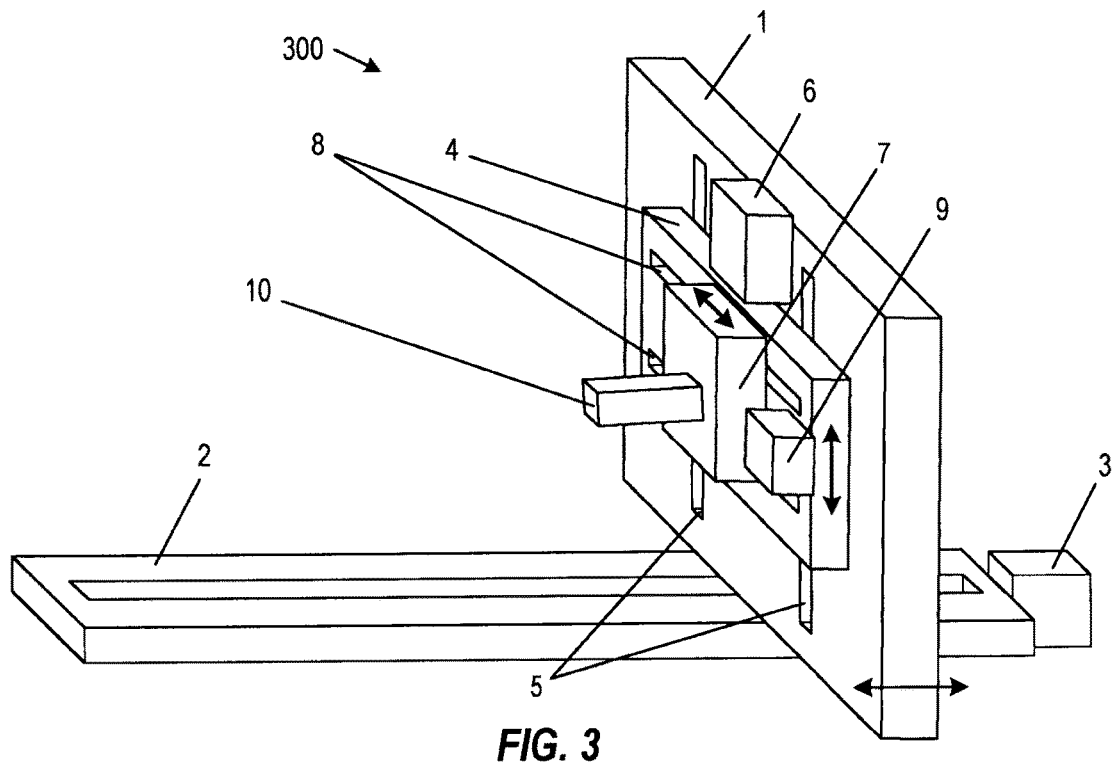
FIG. 3 shows a schematic view of the detector stage in accordance with an example of the present disclosure capable of moving an X-ray detector array along the direction of an X-ray beam and to oscillate the X-ray detector array in a plane perpendicular to the X-ray beam.

FIG. 3 shows a schematic view of an oscillating stage or mounting system 300 capable of moving an X-ray detector array along the direction of an incident (transmitted) X-ray beam and capable of oscillating the X-ray detector array in a plane perpendicular to the X-ray beam direction. Mounting system 300 includes a base 1 that is mounted on a guide 2, which permits base 1 to be slid along the beam direction. For example, base 1 and guide 2 may be connected through a ball-screw motion transmission that transmits the rotational movement from an electrical motor 3 to the translational movement of base 1.

Structure for transverse oscillation of the detector array may be mounted on base 1. As shown in FIG. 3, a structural element 4 is mounted in slots 5 in base 1, which permits structural element 4 to move or oscillate in the vertical direction along vertical guides 5. An exciter 6 is coupled between base 1 and structural element 4 to drive movement or oscillations of element 4 along guides 5. Exciter 6 may, for example, include a stepper motor with coupling or transmission such that an electric signal applied to exciter 6 controls the vertical position of structural element 4 relative to base 1. Another structural element 7 engages with horizontal guides 8 in structural element 4, and an exciter 9 coupled to structural elements 4 and 7 drives movement or oscillations of structural element 7 back and forth along horizontal guides 8. Exciters 8 may include a stepper motor with coupling or transmission such that an electric signal applied to exciter 8 controls the horizontal position of structural element 7 relative to structural element 4. A rod, pin, or other structure 10 may provide a mounting for the X-ray detector array or alternatively an X-ray projector.

In still another example disclosed herein, a diffractometer includes one or more devices that excite transverse vibrations of the X-ray beam projector, e.g., X-ray beam projector 110 of FIG. 1, so that the incident X-ray micro-beam, e.g., X-ray beam 134, moves on the analyzed object parallel to itself and the location where the transmitted X-ray micro-beam, e.g., beam 136, strikes the detector array also move. For this example, mounting system 300 may hold the X-ray beam projector.

Figure 4:
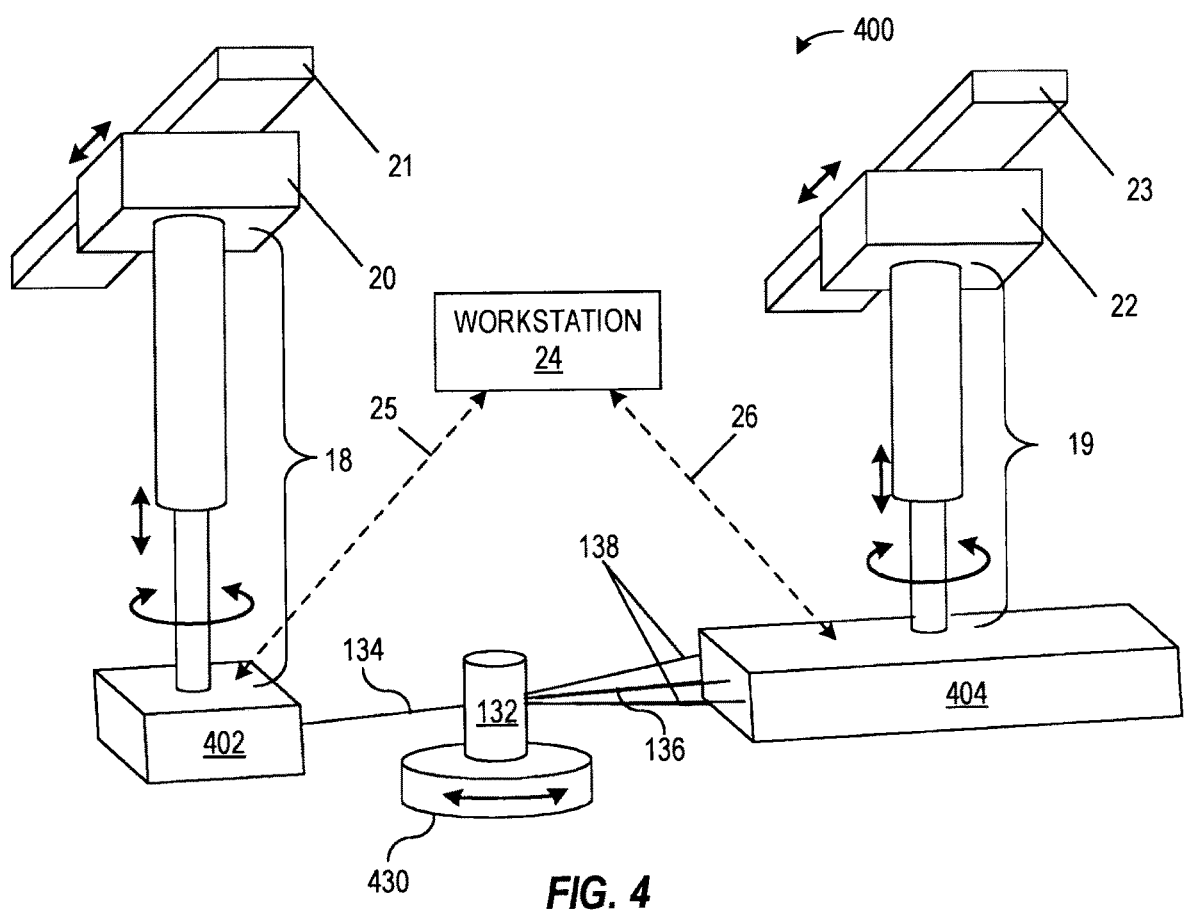
FIG. 4 shows an example of a diffractometer system in which an X-ray transmitter and an X-ray receiver are mounted on separate telescoping arms.

FIG. 4 shows an example of a diffractometer system 400 including an X-ray transmitter 402 and an X-ray receiver 404, which may be similar or identical to the X-ray devices described above. In particular, X-ray transmitter 402 provides an incident X-ray micro-beam 134 directed at an analyzed target 132 as described above with reference to FIGS. 1 and 2. (Walls of transmitter 402 and receiver 404 facing target 132 are transparent to X-rays.) In FIG. 4, target 132 is on a rotary positioning device 430. X-ray receiver 404 contains a movable two-dimensional X-ray detector array in a protective container that may be vacuumed or filled with an inert gas as described above. The X-ray detector array may be moved with the help of an oscillating mounting structure such as shown in FIG. 3. The X-ray detector array may be designed to detect both the transmitted micro-beam of X-ray 136 passed through analyzed target 132 and all or part of the X-rays 138 that are diffracted or otherwise scattered by target 132.

X-ray transmitter 402 and X-ray receiver 404 of diffractometer system 400 are respectively mounted on telescoping arms 18 and 19, which may be attached to a ceiling of the laboratory or examination room. In particular, system 400 includes two housings 20 and 22 that contain mechanisms and motors designed to move the telescoping arms 18 and 19 along respective guides 21 and 23 that may be fixed on a ceiling. Housings 20 and 22 may also contain mechanisms and motors to extend or retract telescoping arms 18 and 19 to move X-ray transmitter 402 and X-ray receiver 404 vertically up or down and to rotate X-ray transmitter 402 and X-ray receiver 404 about axes of respective telescoping arms 18 and 19. A characteristic feature of this example is the mechanical autonomy of the mechanisms of movement of X-ray transmitter 402 and X-ray receiver 404. These elements of the diffractometer 400 may be interconnected exclusively through a workstation 24 via electrical interconnections particularly via wireless communications. In diffractometer system 400, the X-ray detector array simultaneously detects the transmitted micro-beam 136 of X-ray passed through the analyzed target 132 and all or a portion X-rays 138. These features of diffractometer system 400 reduce the requirements on the accuracy of manufacturing of the mechanical structure and on the rigidity of the bearing elements and simplifies commissioning of diffractometer system 400. All this leads to a reduction in the costs of diffractometer system 400.

Computer workstation 24 may be configured to and communicate with beam projector 402 and X-ray receiver 404 through wired or wireless communication links 25 and 26. Computer workstation 24 may execute software or firmware for control of X-ray devices in X-ray transmitter 402 and X-ray receiver 404 and control of the mechanisms and motors in housings 20 and 22. Workstation 240 may also execute processes for acquisition, processing, storing, and displaying of data received from the 3-D diffractometric structural examination, and also calculation of the parameters of the three-dimensional reciprocal lattice of the studied subject.

Figure 5:
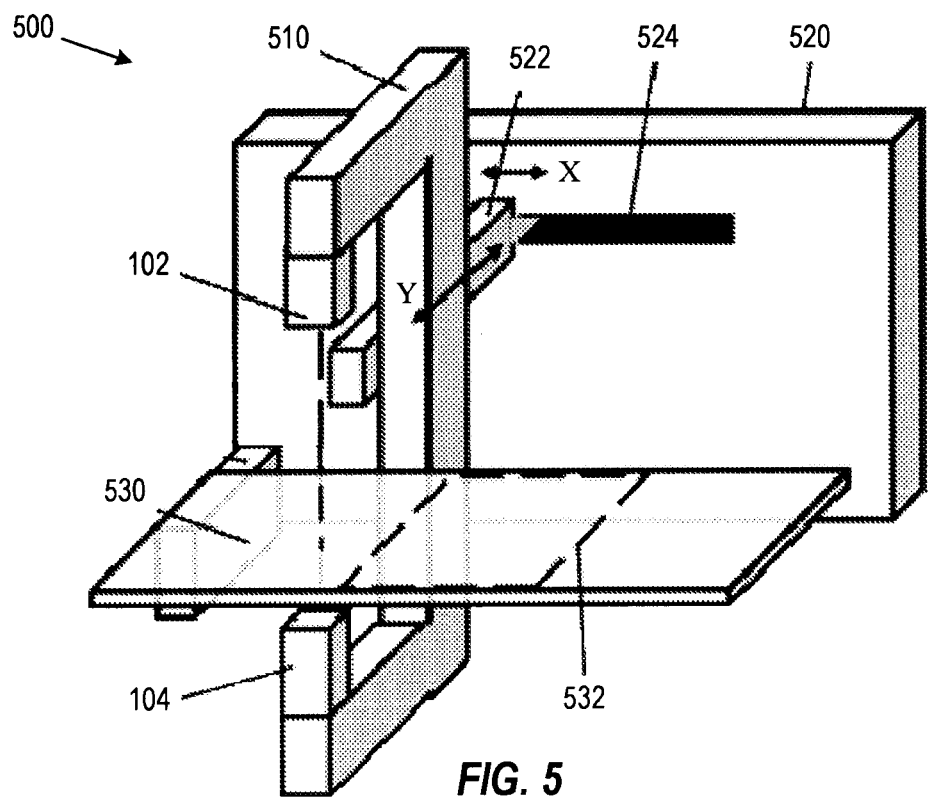
FIG. 5 shows a perspective view of a C-arm diffractometer system in accordance with an example of the present disclosure.
Figure 6:
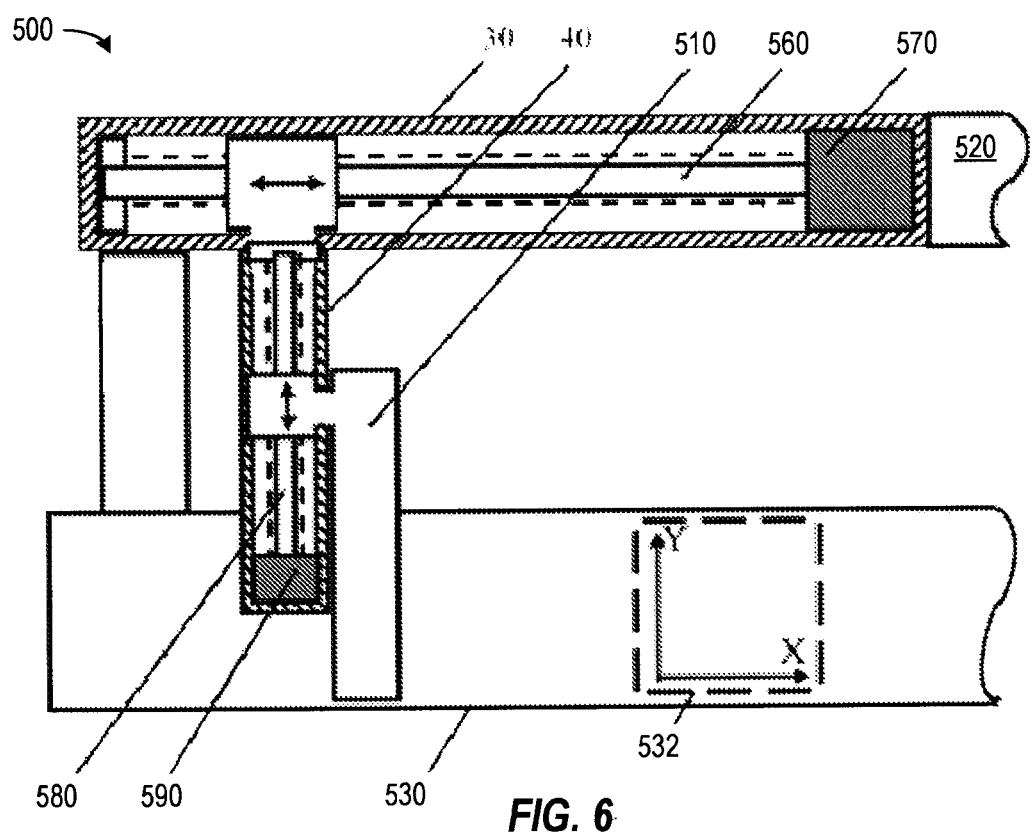
FIG. 6 shows a top view of a C-arm diffractometer system in accordance with an example of the present disclosure.

In still another example disclosed herein, an X-ray beam projector and an X-ray detector may be mounted on a C-arc or C-arm device 500 as shown in the perspective view of FIG. 5 and the top view of FIG. 6. In C-arm device 500, transmitter and receiver housings 102 and 104 such as described above with reference to FIGS. 1 and 2 are at opposite ends a generally c-shaped structure or C-arm 510. C-arm 510 is mounted on a support 522 extending from a drive system 520. Drive system 520 further includes motors and mechanisms to move support 522 and C-arm 510 relative to a positioning area 532 on a holding structure 530 for the target of X-ray analysis, e.g., a breast. Drive system 520 may particularly move support 522 horizontally along a guide 524 on the surface of a base 30 as shown in FIG. 6 to take C-arm 510 to a working position in positioning area 50. In addition, C-arm 510 can move perpendicular to base 30 along a guide 40. To move the C-arm 510 to examination area 532 and back, by way of example, and not by way of limitation, a ball-screw motion transmission 560 may be used which transmits the rotational movement from an electrical motor 570 to the translational movement of C-arm 510. To move second C-arm 510 perpendicular to the plane of base 30, by way of example, and not by way of limitation, a ball-screw motion transmission 280 is used which transmits the rotational movement from an electrical motor 290 to the translational movement.

C-arm 510 may more generally be movable in three mutually perpendicular planes around a target in positioning area 532. In one example, motors 570 and 590 can power movement C-arm 510 independently in the vertical and horizontal directions. C-arm 510 may be further movable to rotate around its symmetry axis and around an axis perpendicular to the C-arm plane. The movement of C-arc 510 may be realized using a parallel translation mechanism such as a ball-screw motion transmission or a combination of a motor-driven feed screw shaft with a slide member that is held in thread-engagement with the feed screw shaft. In another example, rotation of C-arm 510 may be realized by using an appropriate rotary drive mechanism such as a tangent bar type drive mechanism where the drive source is preferably a position-controllable electric motor such as a pulse motor or a servomotor.

Although aspects of the present disclosure have been described in detail with reference to certain implementations, persons possessing ordinary skill in the art to which this disclosure pertains will appreciate that various modifications and enhancements may be made without departing from the spirit and scope of the claims that follow. Any feature, whether preferred or not may be combined with any other feature whether preferred or not. It should be understood that various alternatives to the examples of the invention described herein can be employed in practicing the invention. It is intended that the following claims define the scope of the invention and that methods and structures within the scope of these claims and their equivalents be covered thereby. The appended claims are not to be interpreted as including means-plus-function limitations, unless such a limitation is explicitly recited in a given claim using the phrase "means for."

What is claimed is:

1. A diffractometer comprising:
an X-ray beam projector positioned and aligned to direct an X-ray beam at a target to be examined,
an X-ray receiver comprising an X-ray detector array positioned to detect the X-ray beam passed through the target and detect at least a portion of X-rays that the target diffracts; and
a computer workstation;
wherein the X-ray beam projector comprises a radiation source operating in continuous mode, an apparatus forming X-ray micro-beam and comprising at least one monochromator and at least one collimating and focusing optical device;
wherein the computer workstation is intended for controlling the X-ray beam projector, the X-ray receiver, and mechanisms and motors, and for processing, storing and displaying data received from 3-D diffractometric structural analysis, and also for calculation of parameters of a three-dimensional reciprocal lattice of the target to be examined,
wherein the receiver comprises a mechanism for moving the an X-ray detector array along the direction of the X-ray micro-beam that provides approximately the same resolution of diffraction measurements at small (less than 1 degree) and large (approximately about 90 degrees) angles of diffraction angles and one or more devices designed for excitation of transverse vibrations of a two-dimensional pixel detector in relation to the incident X-ray beam, and
wherein an amplitude of the transverse vibrations of the two-dimensional pixel detector is at least not less than a pixel's pitch.

2. The diffractometer of claim 1, wherein the X-ray detector array is in a protective container that is vacuumed or filled with an inert gas.

3. The diffractometer of claim 2, wherein the inert gas is neon or helium.

4. The diffractometer of claim 1, wherein the one or more devices designed for excitation of transverse vibrations employs a piezoelectric effect.

5. The diffractometer of claim 1, wherein a frequency of the transverse vibrations of the two-dimensional pixel detector is at least not more than a frame rate.

6. The diffractometer of claim 1 wherein the transverse vibrations of the X-ray detector array are carried out due to the excitement of a longitudinal surface acoustic wave.

7. The diffractometer of claim 1, wherein the radiation source is selected from X-ray tube or X-ray laser.

8. The diffractometer of claim 1, wherein the X-ray beam projector and the X-ray receiver are located at opposite ends of a C-arc, wherein the diffractometer further comprises a housing containing mechanisms and motors that move and rotate the C-arc in three mutually perpendicular planes around the target.

9. The diffractometer of claim 1, wherein the X-ray beam projector further includes a Kratki or Montel mirror collimator.

10. The diffractometer of claim 1, wherein the X-ray beam projector further comprises an X-ray collimating mirror with a pair of X-ray mirrors that are arranged orthogonally relative to each other where the X-ray mirrors are multilayer film mirrors.

11. The diffractometer of claim 1, wherein the X-ray detector array includes a plurality of detector elements each of which provide a signal upon receiving of X-ray photon of as incident/transmitted and scattered radiation.

12. The diffractometer of claim 1, further comprising a laser of visible light configured to direct a visible beam to point at the X-ray micro-beam at selected points on the target.

13. The diffractometer of claim 8, wherein the computer workstation executes a process controlling program that performs 3-D diffractometric data collection at different angles of rotation of the C-arc sequentially, and for each angle of rotation of the C-arc, a series of diffraction measurements is carried out with a change in distance from the target to the two-dimensional pixel detector.

14. The diffractometer of claim 1, wherein the X-ray beam projector and the X-ray receiver are mounted on telescoping arms attached to a wall or a ceiling of a laboratory room.

15. The diffractometer of claim 1, wherein the detector array comprises pixels having different values of the maximum permissible power density of X-ray radiation incident on one pixel, with the pixels located in a central region of the detector array having the highest maximum permissible power density compared to the pixels located on a periphery of the X-ray detector array.

16. The diffractometer of claim 15, wherein the maximum permissible power density of each pixel is inversely proportional to a distance between the pixel and a central pixel of the detector array.

17. The diffractometer of claim 1, further comprising one or more devices designed for excitation of transverse vibrations of the X-ray Beam projector so that the incident micro-beam of X-ray moves on the target parallel to itself.

18. The diffractometer of claim 1, wherein the X-ray beam projector and the X-ray receiver are mechanically autonomous elements of design and are interconnected by means of a workstation via electrical interconnections only including wireless communications.

19. A diffractometer comprising:
an X-ray beam projector positioned and aligned to direct an X-ray beam at a target to be examined,
an X-ray receiver comprising an X-ray detector array positioned to detect the X-ry beam passed through the target and detect at least a portion of X-rays that the target diffracts; and
a computer workstation;
wherein the X-ray beam projector comprises a radiation source operation in continuous mode, an apparatus forming X-ray micro-beam and comprising at least one monochromator and at least one collimating and focusing optical device;
wherein the computer workstation is intended for controlling the X-ray beam projector, the X-ray receiver, and mechanisms and motors, and for processing, storing and displaying data received from 3-D diffractometric structural analysis, and also for calculation of parameters of a three-dimensional reciprocal lattice of the target to be examined, wherein the receiver comprises a mechanism for moving the X-ray detector array along the direction of the X-ray micro-beam that provides approximately the same resolution of diffraction measurements at small (less than 1 degree) and large (approximately about 90 degrees) angles of diffraction angles and one or more devices designed for excitation of transverse vibrations of a two-dimensional pixel detector in relation to the X-ray micro-beam, and wherein a frequency of the transverse vibrations of the two-dimensional pixel detector is at least not more than a frame rate.

20. A diffractometer comprising:

an X-ray beam projector positioned and aligned to direct an X-ray beam at a target to be examined, an X-ray receiver comprising an X-ray detector array positioned to detect the X-ray beam passed through the target and detect at least a portion of X-rays that the target diffracts; and a computer workstation;

wherein the X-ray beam projector comprises a radiation source operation in continuous mode, an apparatus forming X-ray micro-beam and comprising at least one monochromator and at least one collimating and focusing optical device;

wherein the computer workstation is intended for controlling the X-ray beam projector, the X-ray receiver, and mechanisms and motors, and for processing, storing and displaying data received from 3-D diffractometric structural analysis, and also for calculation of parameters of a three-dimensional reciprocal lattice of the target to be examined, wherein the detector array comprises pixels having different values of maximum permissible power denstity of X-ray radiation incident on one pixel, with the pixels located in a central region of the detetor array having the highest maximum permissible power density compared to the pixels located on a periphery of the X-ray detector array, and wherein the maximum permissible power density of each pixel is inversely proportional to a distance between the pixel and a central pixel of the detector array.

* * * * *